(12) United States Patent
Tuttle

(10) Patent No.: US 8,581,703 B2
(45) Date of Patent: *Nov. 12, 2013

(54) METHODS AND APPARATUSES TO SECURE DATA TRANSMISSION IN RFID SYSTEMS

(75) Inventor: John R. Tuttle, Boulder, CO (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,950

(22) Filed: May 4, 2012

(65) Prior Publication Data

US 2012/0218083 A1 Aug. 30, 2012

Related U.S. Application Data

(63) Continuation of application No. 12/043,771, filed on Mar. 6, 2008, now Pat. No. 8,174,362.

(51) Int. Cl.
*H04Q 5/22* (2006.01)
(52) U.S. Cl.
USPC ........................................................ 340/10.1
(58) Field of Classification Search
USPC ........... 340/10.1; 380/270, 31, 33, 43; 342/77
See application file for complete search history.

(56) References Cited

U.S. PATENT DOCUMENTS

| 7,548,152 | B2 | 6/2009 | Hillier |
| 7,610,813 | B2 | 11/2009 | Hughes et al. |
| 8,174,362 | B2 * | 5/2012 | Tuttle ........................ 340/10.1 |
| 2009/0214037 | A1 | 8/2009 | Tuttle |

OTHER PUBLICATIONS

EPCglobalInc., "Specification for RFID Air Interface: EPC Radio-Frequency Identity Protocols- Class-1 Generation-2 UHF RFID-Conformance Requirements," Version 1.0.4, Jul. 26, 2006.
USPTO Transaction History of U.S. Appl. No. 12/037,646, filed Feb. 26, 2008, entitled "Methods and Apparatuses to Secure Data Transmission in RFID Systems Against Eavesdropping".

* cited by examiner

*Primary Examiner* — Vernal Brown
(74) *Attorney, Agent, or Firm* — Lerner, David, Littenberg, Krumholz & Mentlik, LLP

(57) ABSTRACT

Methods and apparatuses to secure data transmission in a radio frequency identification (RFID) system against eavesdropping, using multiple communication channels. In one embodiment, a method includes communicating key information and cipher text generated based on the key information, or plain text, using a plurality of different, distinct and separate communication channels connected to an RFID tag.

13 Claims, 10 Drawing Sheets

| | | | | |
|---|---|---|---|---|
| Message | B1 300 | B2 302 | ••• | Bn 304 |
| Random Numbers | R1 310 | R2 312 | ••• | Rn 314 |
| Generated Keys | K1 320 | K2 322 | ••• | Kn 324 |
| Cipher Text | C1 330 | C2 332 | ••• | Cn 334 |

| | | | | | | | |
|---|---|---|---|---|---|---|---|
| Transmission Sequence | R1 310 | C1 330 | R2 312 | C2 332 | ••• | Rn 314 | Cn 334 |

FIG. 15

| | | | | |
|---|---|---|---|---|
| Message | B1 350 | B2 352 | ••• | Bn 354 |
| Random Keys | R1 360 | R2 362 | ••• | Rn 364 |
| Cipher Text | C1 370 | C2 372 | ••• | Cn 374 |
| Encrypted Keys | E1 380 | E2 382 | ••• | En 384 |

| | | | | | | | |
|---|---|---|---|---|---|---|---|
| Transmission Sequence | E1 380 | C1 370 | E2 382 | C2 372 | ••• | En 384 | Cn 374 |

METHODS AND APPARATUSES TO SECURE DATA TRANSMISSION IN RFID SYSTEMS

CROSS-REFERENCE TO RELATED APPLICATIONS

The present application is a continuation, of U.S. patent application Ser. No. 12/043,771, which was filed Mar. 6, 2008 and is scheduled to issue as U.S. Pat. No. 8,174,362 on May 8, 2012, the disclosure of which is hereby incorporated herein by reference.

BACKGROUND OF THE INVENTION

At least some embodiments disclosed herein relate to cryptography in general and, more particularly but not exclusively, to secure data communications between radio frequency identification (RFID) tags and their readers.

In cryptography, a method known as "one-time pad" encrypts a plain text message use a key or "pad" that is as long as the plain text message and is used only once. When used properly, the one-time pad method has the property of "perfect secrecy" where the encrypted message provides no information about the original message, except the length of the original message.

However, various implementation requirements imposed by the proper use of the "one-time pad" method discourage its use in modern communication systems. Thus, alternative methods that do not have the property of "perfect secrecy" are commonly used. For example, some symmetric encryption methods use complex patterns of substitution and transpositions to secure the information, based on the knowledge that there is no known cryptanalytic procedure which can reverse these transformations without knowing the key used during encryption. For example, some asymmetric encryption methods secure the information based on mathematical problems that are thought to be difficult to solve, such as integer factorization and discrete logarithms.

In a current EPCglobal standard for radio frequency identification (RFID), a cover-coding cryptographic scheme is used to provide some protection for certain communications between a RFID reader and a RFID tag. For example, the reader may issue a request for a random number; and in response the tag provides a new 16-bit random number. The reader then generates a 16-bit cipher text through computing the bitwise exclusive OR of the 16-bit random number and the 16-bit message that is to be transmitted from the reader to the tag. After the reader issues a command with the 16-bit cipher text as a parameter, the tag decrypts the received cipher text by computing the bitwise exclusive OR of the 16-bit random number and the received 16-bit cipher text.

In the EPCglobal standard for radio frequency identification (RFID), the random number and the cipher text are transmitted in the same communication session.

BRIEF SUMMARY OF THE INVENTION

Described herein are methods and apparatuses to secure data transmission in a radio frequency identification (RFID) system against eavesdropping, using multiple communication channels. Some embodiments are summarized in this section.

In one embodiment, a method includes communicating key information and cipher text generated based on the key information, or plain text, using a plurality of different communication channels connected to an RFID tag.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIGS. 15 and 16 show methods to transmit blocks of a message via interleaving transmission of blocks of random numbers and blocks of cipher text.

DETAILED DESCRIPTION

Figure 1:
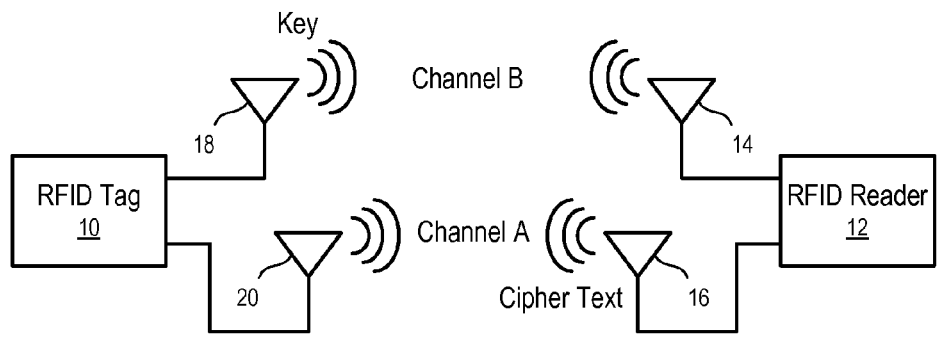
FIG. 1 shows a radio frequency identification (RFID) system to secure data communication using multiple channels according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment of the disclosure provides a cryptography method which can be used to improve the data security for communications between radio frequency identification (RFID) tags and their readers. The cryptography method can also be used in communications between other devices over various communication channels, such as wireless radio link, Internet, etc.

The cover-coding cryptographic scheme specified in a current EPCglobal standard for radio frequency identification (RFID) is vulnerable to eavesdropping. Since the random number that is to be used as the encryption key is transmitted over the air when the encryption key is needed to transmit a parameter, the random number transmitted over the air can be sniffed by the same eavesdropper who sniffs the encrypted parameter. Thus, the eavesdropper can obtain both the random number and the cipher text by monitoring a communication session to decrypt the transmitted parameter.

In one embodiment of the disclosure, portions of crypto information are transmitted via separate communication channels to improve security. Communication channels are used as part of the cryptographic process. For example, antennas for signals of different polarizations can be used to establish different communications channels. For example, different communication channels can be established at different locations and/or time periods. In one embodiment, encryption is performed based at least in part on distributing information across multiple communication channels according to a key.

In one embodiment, the way the communication channels are used is a secret not available to eavesdroppers or sniffers. The secretive use of multiple communication channels can improve security against eavesdropping. In one embodiment, the way the communication channels are used is controlled according to a key. Without the key the eavesdroppers or sniffers cannot reconstruct the transmitted data from the content sniffed from the communication channels.

In one embodiment, different portions of cryptographic data are sent through different channels. Channels may be different in various aspects, such as connection time, location, mode of signal modulation, signal polarization, carrier frequency, etc. Compared to having all the cryptographic information flowing through one channel, as in a current EPCglobal standard, methods of the present disclosure would be more secure, since it would be less likely and more difficult for an eavesdropper to have access to all the channels, any of which may carry data which can be further encrypted by the same or another key.

FIG. 1 shows a radio frequency identification (RFID) system to secure data communication using multiple channels according to one embodiment. In FIG. 1, the RFID system includes at least one RFID tag (10) and one RFID reader (12). The RFID reader (12) may use the antennas (14 and 16) to interrogate a plurality of RFID tags, including the tag (10), that are present in the radio frequency communication range. The tag (10) may be implemented using a patch antenna and an integrated circuit (IC) chip having transceiver, memory and logic stages, or be implemented using discrete elements.

In FIG. 1, the RFID tag (10) and reader (12) have at least two different communication channels. One communication channel uses the tag antenna (20) and the reader antenna (16) to transmit cipher text (e.g., via one signal polarization); and another communication channel uses the tag antenna (18) and the reader antenna (14) to transmit the encryption key corresponding to the cipher text (e.g., via another signal polarization). The cipher text and the encryption key can be transmitted concurrently (e.g., substantially simultaneously) or be transmitted during different time periods (e.g., non-overlapping time periods).

In one embodiment, the communication channels selected for the transmission of the key and for the transmission of the cipher text are predetermined for the RFID system. Different tags use the same scheme to transmit the key (e.g., a random number) and the cipher text (e.g., data encrypted using the key). For example, the set of tags can be configured to use channels established via the reader antenna (16) for transmitting cipher text and channels established via the reader antenna (14) for transmitting key.

Alternatively, individual tags and the reader may share different secrets that indicate how the key and the cipher text are transmitted across the communication channels. For example, the RFID tag (10) and the RFID reader (12) may share a secret that indicates that cipher text is transmitted via the channel established via the reader antenna (14) and the text via the channel established via the reader antenna (12).

Further, the key may be divided into portions; and the shared secret can be used to indicate the channels used to transmit the different portions of the key. Similarly, the cipher text can be divided into portions; and the shared secret can be used to indicate the channels used to transmit the different portions of the cipher text. In one embodiment, the key also indicates how to divide the key (or the cipher text into portions) and how to interleave the portions of the key and the portions of the cipher text for concurrent transmission. In another embodiment, the key is used to indicate how false data (e.g., random numbers) and the crypto data are interleaved in the communication channels.

Figure 2:
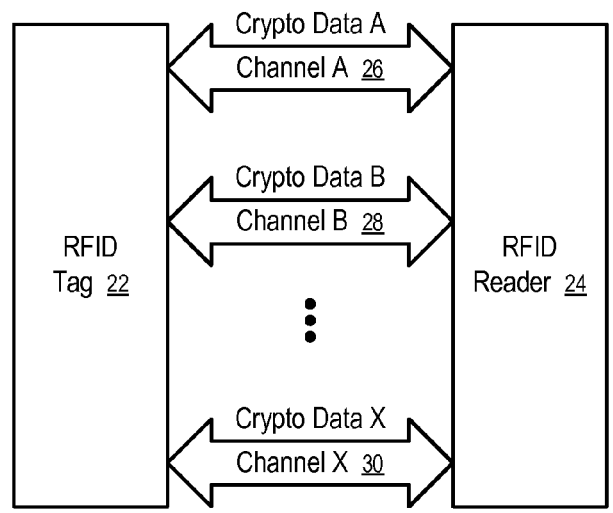
FIG. 2 shows a block diagram of a system to secure data communication using multiple channels according to one embodiment.

In general, the crypto data, such as portions of the encryption key and portions of the cipher text can be transmitted over a plurality of different channels, as illustrated in FIG. 2.

FIG. 2 shows a block diagram of a system to secure data communication using multiple channels according to one embodiment. In FIG. 2, two communication parties, such as an RFID tag (22) and an RFID reader (24), spread the transmission of crypto data, including key and cipher text, over a number of channels (e.g., 26, 28, . . . , 30). Each of the channels may be used to transmit a portion of the key and/or a portion of the cipher text generated using the key. The system can spread the crypto data according to a static, predetermined scheme, or according to a dynamically shared secret. The secret can be a separate key different from the encryption key used to generate the cipher text, or be the same as the encryption key, or be a key generated using at least the encryption key.

In some embodiments, the plain text can be divided into portions and transmitted using multiple channels in a way according to the secret. Thus, the portions of the plain text are scrambled across the channels using the key; and the key is used to reassemble the portions.

In general, any of the communication channels can carry crypto information in either direction and can consist of any medium. Example of media may include wire, fiber optic, wireless radio frequency signals, Internet, phone, telegraph, messenger, or combinations of various media. Different communication channels can be established based on variations in various parameters, which may include location, time, media type, carrier frequency, signal polarization, signal modulation, etc.

In one embodiment, different channels are established at different locations. For example, one portion of crypto information (e.g., key) may be sent at one place (e.g., at an entrance); and another portion of the crypto information (e.g., cipher text) can be sent at another place (e.g., at an exit).

Figure 3:
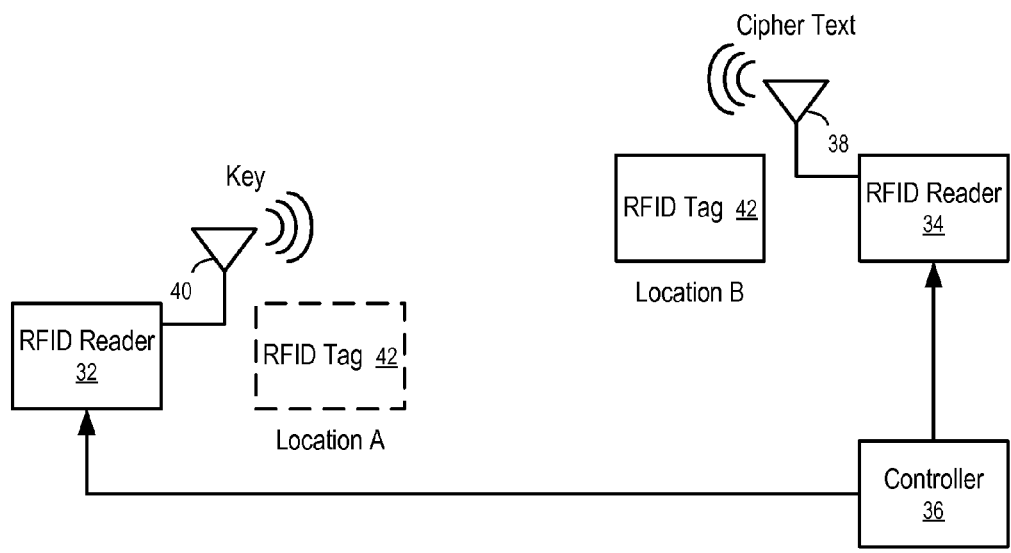
FIG. 3 shows an example of transmitting key and cipher text at different locations according to one embodiment.

FIG. 3 shows an example of transmitting key and cipher text at different locations according to one embodiment. In FIG. 3, the RFID system includes RFID readers (32 and 34) positioned at different locations. In one embodiment, the communication ranges of the readers (32 and 34) do not overlap. When the RFID tag (42) is at location A near the reader (32), a portion of the crypto data (e.g., the random number generated as an encryption key) is transmitted via the communication channel established using the reader antenna (40). The data can be transmitted from the tag (42) to the reader (32), or from the reader (32) to the tag (42). The portion of the crypto data is associated with an identification of the tag and transmitted from the RFID reader (32) to the RFID reader (34) via the controller (36), which may be a host computer, or a special purpose circuit.

When the RFID tag (42) is moved to the location B which is within the communication range of another reader (34), another portion of the crypto data (e.g., cipher text generated using the encryption key) is transmitted via the communication channel established using the reader antenna (38). The data can be transmitted from the tag (42) to the reader (34), or from the reader (32) to the tag (42).

For example, the reader (32) can be used to request a random number from the tag (42). The random number is transmitted to the RFID reader (34) via the controller (36). Thus, the RFID reader (34) can secure communications with the tag (42) through encryption using the shared random number. Alternatively, the reader (32) may provide the encryption key to the RFID tag (42) for use in communications between the RFID tag (42) and reader (34). Alternatively, the RFID reader (32) may provide the cipher text to the tag (42) or receive the cipher text from the tag (42); and the RFID reader (34) is used to exchange the encryption key with the tag (42) for decryption.

In FIG. 3, two separate readers (32 and 34) are used to establish the communication channels with the RFID tag (42) at different locations. Alternatively, the same reader can be connected to two different antennas for establishing the communication channels at different locations.

In one embodiment, the communication ranges of the two antennas for the two communication channels do not overlap. Alternatively, the communication ranges of the two antennas may partially overlapping with each other; and the RFID tag uses the two communication channels concurrently (e.g., via different carrier frequencies and/or polarizations) while in the overlapping region. The size and shape of the overlapping region can be controlled to reduce the risk of eavesdropping.

In one embodiment, different channels can be established at different times. For example, a part of crypto information (e.g., key) can be sent in the morning and used in the afternoon for encrypted transmissions (e.g., transmitted via different and/or multiple sessions).

Figure 4:
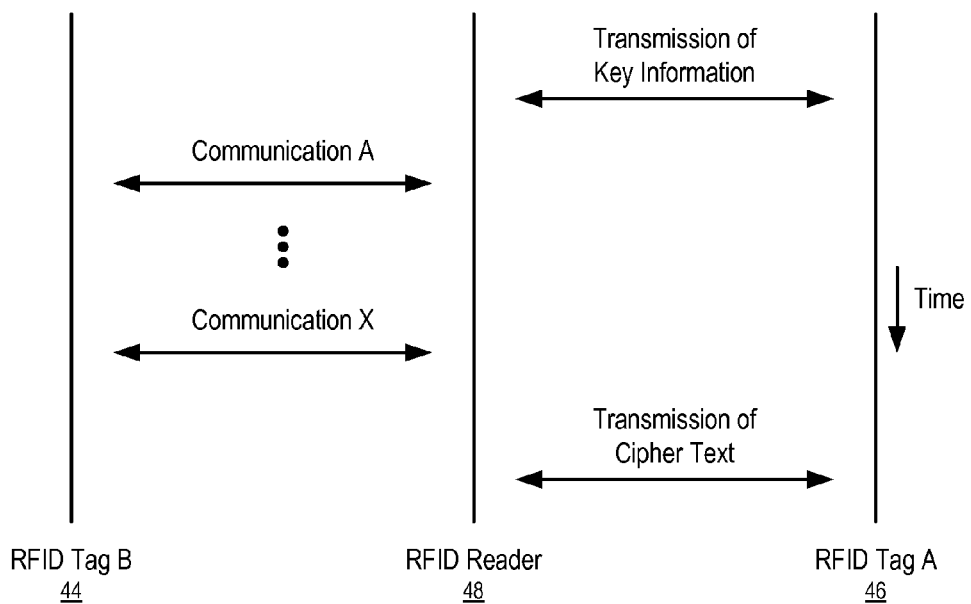
FIG. 4 shows an example of transmitting key and cipher text at different time periods according to one embodiment.

FIG. 4 shows an example of transmitting key and cipher text at different time periods according to one embodiment. In FIG. 4, a time gap is provided between the transmissions of the key information and the cipher text generated using the key information. In one embodiment, the communication sessions between the RFID reader (48) and the RFID tag (46) for transmitting the key information and for transmitting the cipher text are separated by other communication sessions, such as communications with one or more other RFID tags (e.g., 44). Data security can be improved when the communication channels are established at different time periods (e.g., via non-overlapping communication sessions).

In an RFID system, the key can be generated on the tag and sent to a networked reader for later use on the computer network, or the key may be sent from the reader to the tag for later use in encrypting tag data. The tag may use the key to create and send a cipher text later, or in a different place. For example, a key may be transmitted at a distribution center; and the cipher text generated using the key can be transmitted at a retail store. Both parties will know the key, but an eavesdropper would not.

In one embodiment, a key is used to define a pattern or template which is used to control the switching between at least two data channels for transmitting of crypto information. For example, when two channels are used (e.g., channel 1 and channel 2), the bit string of the key can be used to determine which channel is carrying data during the time period corresponding to a bit. For example, if a key bit is high (e.g., 1), channel 1 carries the data; if a key bit is low (e.g., 0), channel 2 carries data. Thus, channel 1 is used to carry data for the time periods while the corresponding key bits remain high; and the channel 2 is used to carry data for the time periods while the corresponding key bits remain low. The key bit width and the data bit width do not have to be the same, but it would be beneficial to have data bit width equal to integer multiples of the key bit width. Thus, the data (e.g. plain text or cipher text generated using the same key or a different key) appears on the channel dictated by the corresponding bit in the key sequence. The key sequence can be a string of random numbers, pseudo random numbers, or other numbers. The receiving system using the same key sequence to switch back and forth between channel 1 and channel 2 to recover the data.

Figure 5:
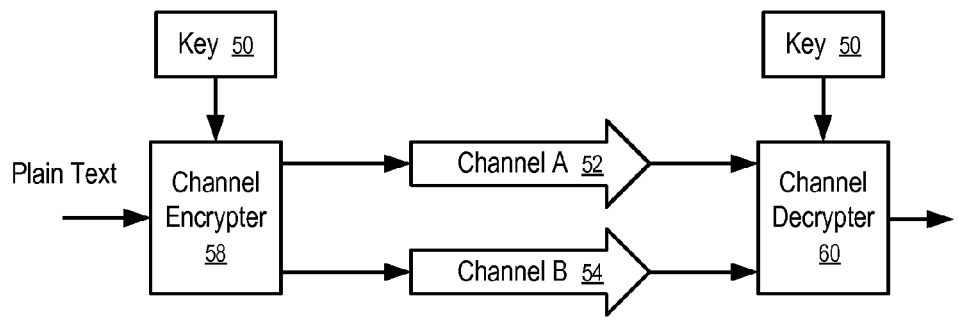
FIG. 5 shows an example of transmitting cipher text using multiple channels according to one embodiment

FIG. 5 shows an example of transmitting cipher text using multiple channels according to one embodiment. In FIG. 5, cipher text is transmitted via a two channels (52 and 54). The channels can be used in parallel, or used sequentially, or some used in parallel and some used sequentially.

In FIG. 5, the channel encrypter (58) is used to place portions of the plain text on selected channels of the set of available channels (52 and 54). For example, the plain text can be divided into a plurality of portions; each of the portions is assigned by the channel encrypter (58), according to the key (50), to one of the communication channels (52 and 54). Thus, the channel encrypter (58) scrambles the plain text in terms of the present of the text in the channels. The channel decrypter (60) re-assemble the portions according to the same key (50) to reconstruct the transmitted cipher text. Thus, the presence of different portions of the plain text is scrambled in the set of channels according to the key.

In another embodiment, the cipher text, generated using the key (50) or another key (not shown in FIG. 5), is divided into portions for transmission using the plurality of communication channels (58) according to the key (50).

In a further embodiment, different portions assigned to different channels are queued and transmitted concurrently using the plurality of communication channels (58). The received portions are re-assembled according to the key (50). Thus, the time period for the transmission can be reduced. For example, each of the channels may be assigned a substantially equal amount of data for transmission in parallel. Thus, the data to be transmitted are distributed across the channels according to the key (50); and the key (50) is used to descramble and reassemble the data.

For example, in one embodiment, the data to be transmitted via N channels are divided into N portions which are transmitted in parallel using the N channels. However, each of the portions is transmitted using a channel specified according to the key (50). Thus, after the receiver obtains the N portions concurrently, the receiver uses the key (50) to reassemble the portions in a correct sequence to recover the transmitted data.

In one embodiment, false data values are provided on a channel when the channel is deselected according to the key sequence. The use of the false data can improve the data security by misleading the eavesdropper. In one embodiment, the false data is randomly generated for further obfuscation.

Figure 6:
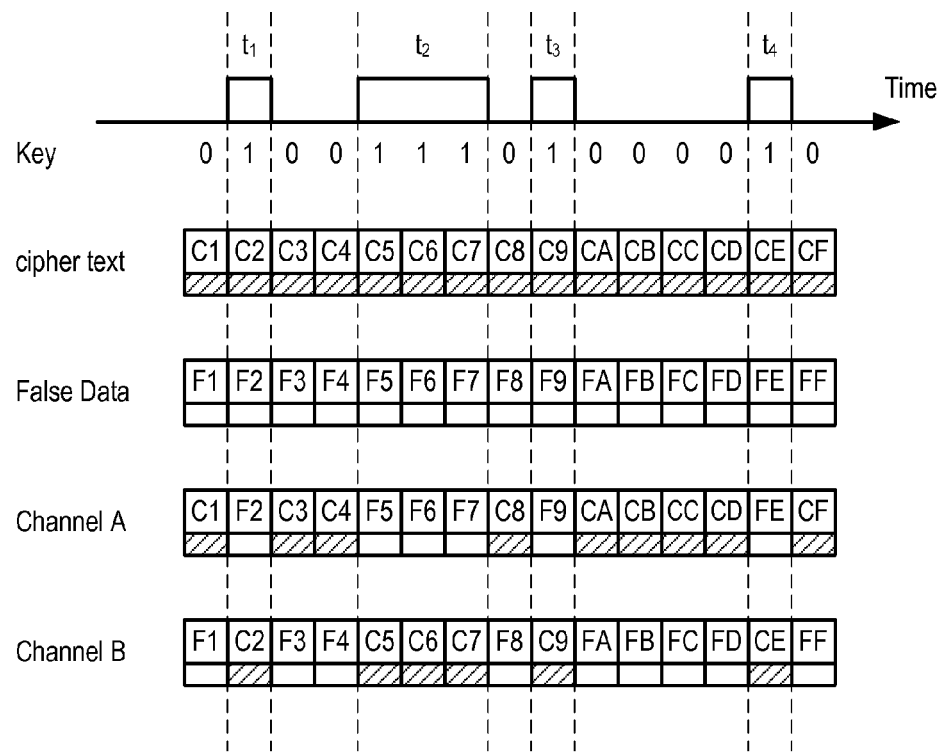
FIG. 6 shows a method of using key to select channels for transmission portions of cipher text according to one embodiment.

FIG. 6 shows a method of using key to select channels for transmission portions of cipher text according to one embodiment. In FIG. 6, the false data (e.g., F1, F2, ..., FF) and the cipher text (e.g., C1, C2, . . . , CF) are interleaved in different time slots according to the key sequence (e.g., 0100111010000010) for transmission over channel A and channel B. Alternatively, the plain text can be interleaved with the false data for transmission over the channels without first being encrypted using the key (or a different key).

In FIG. 6, for the time slots where the key sequence has a bit value of 1 (e.g., t1, t2, t3, t4), corresponding portions of the text (e.g., C2, C5-C7, C9, CE) are transmitted using channel B; and portions of the false data (e.g., F1, F3-F4, F8, FA-FD, FF) are transmitted via channel B in the remaining time slots. Thus, portions of the text and portions of the false data are interleaved in the time slots for transmission in channel B.

Similarly, for the time slots where the key sequence has a bit value of 1 (e.g., t1, t2, t3, t4), the false data (e.g., F2, F5-F7, F9, FE) are transmitted using channel A; and corresponding portions of the text (e.g., C1, C3-C4, C8, CA-CD, CF) are transmitted via channel A in the remaining time slots. Thus, portions of the text and portions of the false data are interleaved in the time slots for transmission in channel A.

The receiver can use the key to select and merge the portions of text received from different channels (e.g., channel A and channel B) to reconstruct the cipher text.

In one embodiment, the same key is used to generate the cipher text and to select and interleave the portions. Alternatively, different keys can be used to generate the cipher text and to select and interleave the portions. In a further embodiment, portions of plain text can be directly scrambled and interleaved with the false data for transmission using the different channels.

In one embodiment, more than two channels are used; and blocks of bits of the key sequences can be used to identify channels in which the corresponding blocks of text (e.g., plain text or cipher text) are transmitted.

In FIG. 6, the number of time slots used in each of the channels is equal to the number of blocks of text identified by the key sequences (e.g., the number of bits). Alternatively, the portions of the text can be assigned to the channels and padded with a predetermined number of blocks of false data. For example, between portions C4 and C8 of the cipher text transmitted in channel A, one portion of false data may be padded instead of the portions (F5-F7) that are equal to the amount of text that are transmitted in channel B. Thus, the number of time slots used in each of the channels may not equal to the number of blocks of the text identified by the key sequences.

Further, in another embodiment, no false data is padded. Thus, the sequences of data transmitted in channel A would be C1, C3, C4, C8, CA, CB, CC, CD, CF, as selected by the bits having a value of 0 in the key; and the sequences of data transmitted in channel B would be C2, C5, C6, C7, C9, CE, as selected by the bits having a value of 1 in the key. In some embodiments, the key sequence is constructed to assign equal numbers of portions to each of the channels (e.g., having equal numbers of "1" bits and "0" bits). Alternatively, the channels can be padded according to a predetermine scheme to have an equal amount of transmitted data.

In one embodiment, a random number or a key is split into parts, some parts of which are sent on different channels and later recombined by the receiver. For example, the key can be split into first half and second half for transmission over channel 1 and channel 2, respectively.

In one embodiment, a random number is generated by the tag at the time of manufacture, stored in the tag memory and provided to a user of the tag via a different channel, such as via electronic data transfer to the user's computer using a secure Internet link. Thus, the random number can be later used as a secure key by itself or in combination with a further random number exchanged in communication with a reader. For example, the stored secure key can be used to control channel multiplexing for the transmission of the further random number and/or the cipher text generated using the further random number (and/or the stored secure key).

In one embodiment, multiple keys are used at separate times or one after another, or alternating. Such a code can be used to further cover the plain text. A key can also be used to double cover code. For example, the sender may generate two different random numbers at different times. An encryption key is generated by combining the different random numbers (e.g., via an XOR operation). When the transmissions of the random numbers are widely separated in time and location, the data security and privacy are improved. For example, when a tag first appears in a reader's field, a random number RN1 is generated by the tag and sent to the reader for later use in generating another random number RN2, which when combined with RN1 will produce a more secure key. The random number RN1 can be associated with the particular tag and used subsequently during the time period in which the tag is used by a user (e.g., a retailer). Once the tag ID and the RN1 are in the user's computer system, the tag does not have to regenerate and retransmit the RN1, even when the tag goes to a different reader, store, or department. Under the control of a system level software application, a command for the tag to generate a RN1, which both the tag and the computer system will store and save for later use in generating cipher text. Such a method is much more secure than the method according to a current EPCglobal standard.

In one embodiment, instead of using the random number as the encryption key, a separate encryption key is generated from the random number using additional information not accessible to the eavesdropper. Since the random number obtained by the eavesdropper is not sufficient to generate the key for the decryption of the transmitted message, the use of the separate encryption key prevents the eavesdropper from obtaining a decrypted version of the transmitted message.

For example, a secret shared between the reader and the tag can be used to generate the encryption key which can be a combination of the secret and the random number. The secret is stored in the memory of the reader and the tag. Since the eavesdropper does not have the secret shared between the reader and the tag, the eavesdropper cannot generate the encryption key to decrypt the transmitted message. Thus, the security of the data communication between the reader and the tag is improved.

Figure 7:
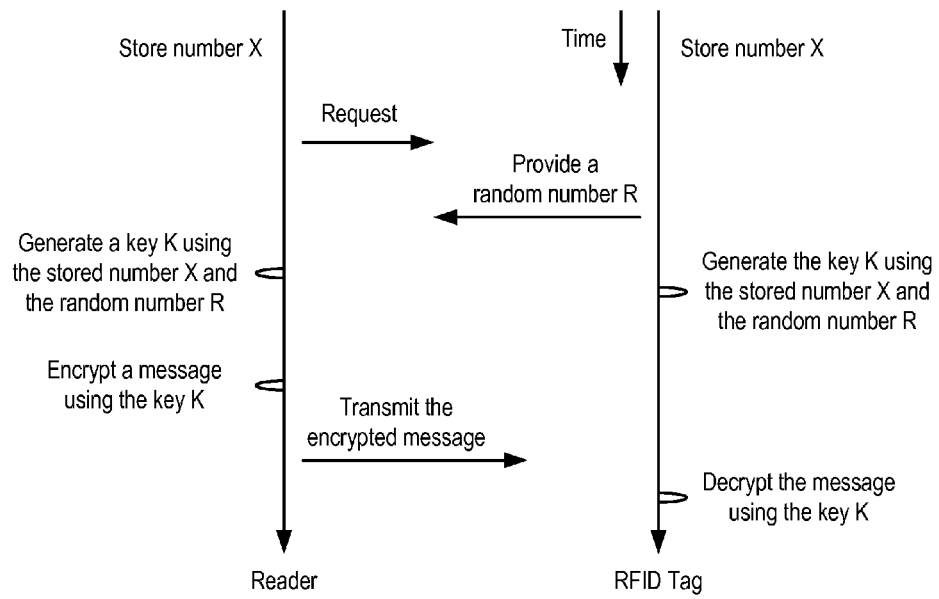
FIG. 7 shows a process to transmit a message from a radio frequency identification (RFID) reader to an RFID tag according to one embodiment

FIG. 7 shows a process to transmit a message from a radio frequency identification (RFID) reader to an RFID tag according to one embodiment. In FIG. 7, the reader and the tag store a number X in their memory. Thus, the number X is a secret to an eavesdropper. In FIG. 7, the secret number X is combined with the transmitted random number R to generate an encryption key K to secure the transmission against eavesdropping.

The number X can be shared between the reader and the tag in various ways. For example, the reader and the tag can share the secret at a secure location through reading from or writing into the tag. The secure location can be electromagnetically shielded to prevent eavesdropping. Alternatively, or in combination, the reader and the tag can share the secret in an earlier communication session. The earlier communication session can be separated from the current communication session by one or more other communication sessions with the same tag and/or with other tags. The earlier communication session can be conducted at a different location out of the current interrogating range of the reader. The earlier communication session can involve a different reader that is out of the current range of the current reader; and the reader used in the earlier communication session can transmit the secret to the current reader via a secure data communication channel.

In FIG. 7, to transmit a message to the tag, the reader sends a request to the tag via an interrogating electromagnetic wave. The request can be an explicit command to request for a random number or an implicit command for other purposes. In response, the tag provides a random number R.

In one embodiment, the RFID tag is a passive tag that does not have an internal battery or power source. The RFID tag operates using the power drawn from the interrogating electromagnetic wave and provides the random number through the modulation of the backscattering of the interrogating electromagnetic wave.

In another embodiment, the RFID tag is a semi-active tag that has an internal battery or power source. The RFID tag operates using the power drawn from the internal battery or power source and provides the random number through the modulation of the backscattering of the interrogating electromagnetic wave.

In a further embodiment, the RFID tag is an active tag that has an internal battery or power source, using which the RFID tag generates a separate transmission signal, independent from the interrogating electromagnetic wave, to provide the random number.

In one embodiment, the random number R is generated in response to the request received from the reader; and the RFID tag generates a new random number in response to each request for a random number.

In FIG. 7, the secret number X is combined with the transmitted random number R to generate an encryption key K. Instead of using the random number R to directly encrypt a message, the reader uses the encryption key K, generated from both the secret number X and the transmitted random number R, to encrypt the message transmitted to the tag. The tag separately generates the same key K, using the stored number X and the newly communicated random number R. After receiving the message encrypted using the implicitly transmitted key K, the tag uses the key K that is independently generated on the tag to decrypt the transmitted message.

Since the stored number X is a secret to the eavesdropper, the communication session is secure against eavesdropping of the transmitted random number and the encrypted message.

Figure 8:
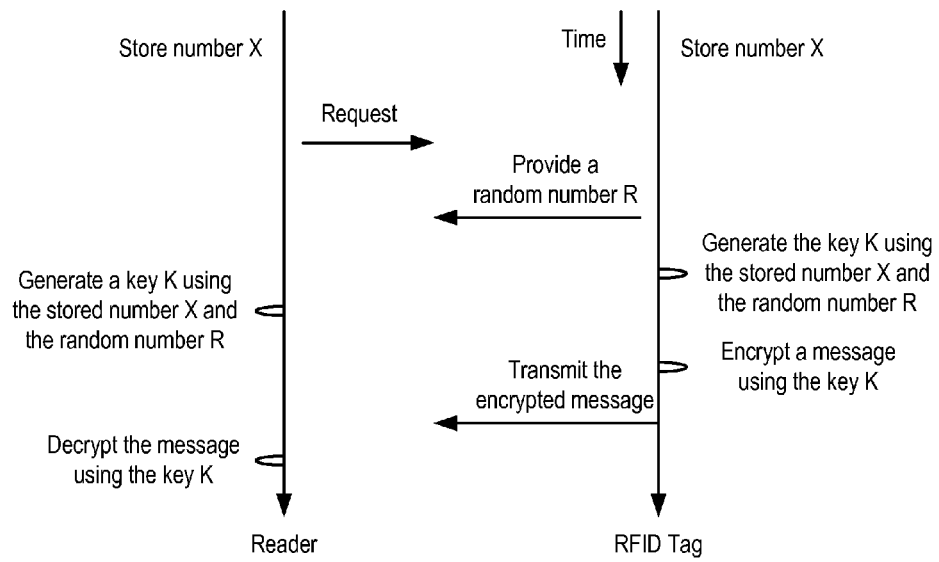
FIG. 8 shows a process to transmit a message from a radio frequency identification (RFID) tag to an RFID reader according to one embodiment.

FIG. 8 shows a process to transmit a message from a radio frequency identification (RFID) tag to an RFID reader according to one embodiment. In FIG. 8, in response to the reader's request, the tag provides a random number R (e.g., via modulation of backscattering wave or via a response signal). The reader and the tag separately combine the stored number X and the random number R to generate a key K.

In FIG. 8, the tag transmits the encrypted message as part of the response to the request for a random number, after the tag transmits the random number R to the reader. Alternatively, the tag can transmit the encrypted message before the random number R is transmitted to the reader. In another embodiment, the encrypted message is transmitted in response to a separate command/request from the reader.

After obtaining the encrypted message and the random number, the reader decrypts the transmitted message using the key generate from the stored number X and the received random number.

In FIGS. 7 and 8, the encryption key K can be considered a "Ghost" key represented by the random number R. Although the random number R is transmitted explicitly over the air, the "Ghost" key is not sent explicitly over the air. Without the secret number X, the implicit transmission of the "Ghost" key is secure against eavesdropping.

In FIGS. 7 and 8, the random number R is generated and transmitted without using the stored number X. The encryption key K is generated using both the stored number X and the random number R so that an eavesdropper cannot reconstruct the encryption key K from the random number R. For example, the encryption key K can be generated through encrypting the stored number X using the random number R (or encrypting the random number R using the stored number X), or through decrypting the stored number X using the random number R as if the encryption key K were encrypted using the random number R to generate the stored number X (or through decrypting the random number R using the stored number X).

Alternatively, the random number can be sent in an encrypted form, encrypted using the secret number X. The random number decrypted from the transmission can be used as the key that is to be used to encrypt the message transmitted from or to the reader. The random number can be encrypted using the same method to encrypt the message transmitted from or to the reader (e.g., via bitwise exclusive OR, or via a modular adder, or other types of encoders), or using a different method.

Figure 9:
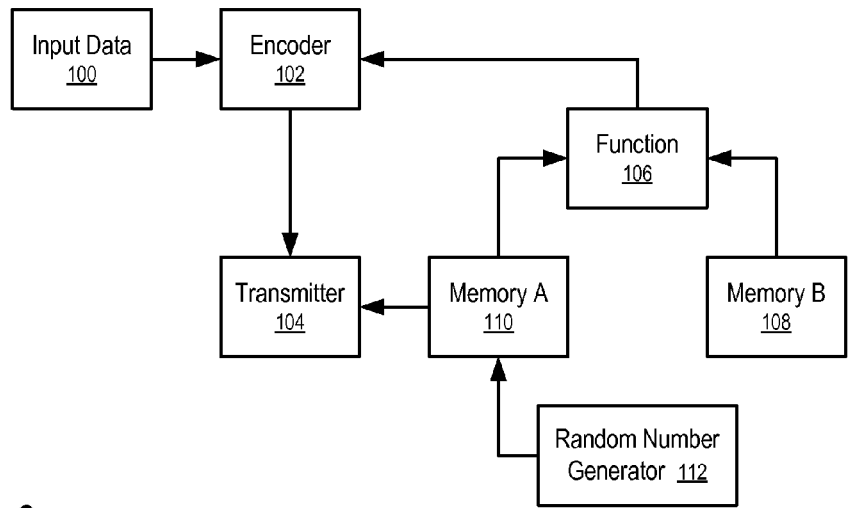
FIG. 9 shows a system to transmit encrypted messages according to one embodiment.

FIG. 9 shows a system to transmit encrypted messages according to one embodiment. In FIG. 9, the transmitting system includes a memory B (108) to store a secret and a memory A (110) to store a random number provided by the random number generator (112). The logic function (106) combines the random number obtained from the memory (110) and the secret obtained from the memory (108) to generate an encryption key for the encoder (102), which encrypts the input data (100) using the encryption key. The transmitter (104) is configured to transmit the encrypted input data obtained from the encoder (102) and the corresponding random number obtained from the memory (110), separately or together.

Figure 10:
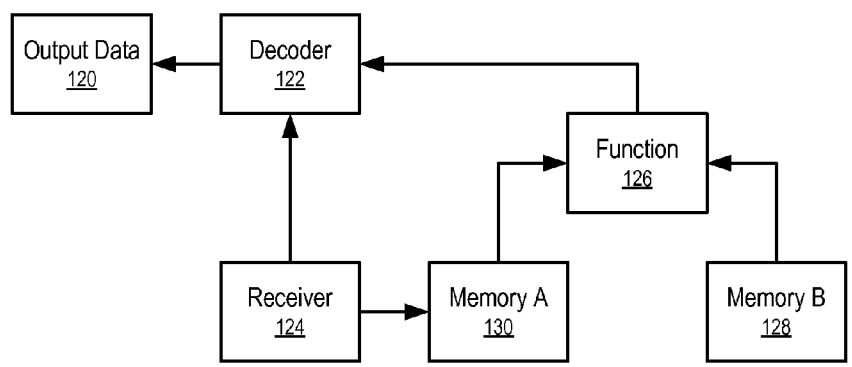
FIG. 10 shows a system to receive encrypted messages according to one embodiment.

FIG. 10 shows a system to receive encrypted messages according to one embodiment. In FIG. 10, the receiver (124) is configured to receive the encrypted input data and the corresponding random number (e.g., from the transmitting system of FIG. 9). The receiving system of FIG. 10 includes a memory B (128) to store the same secret as the corresponding memory (108) of the transmitting system of FIG. 9. The memory A (130) is to store the random number obtained from the receiver (124). The logic function (126) combines the random number obtained from the memory A (130) and the secret obtained from the memory B (128) to generate the same encryption key as the transmitting system of FIG. 9. Using the encryption key obtained from the logic function (126), the decoder (122) decrypts the encrypted data obtained from the receiver (124) to generate the output data (120).

Figure 11:
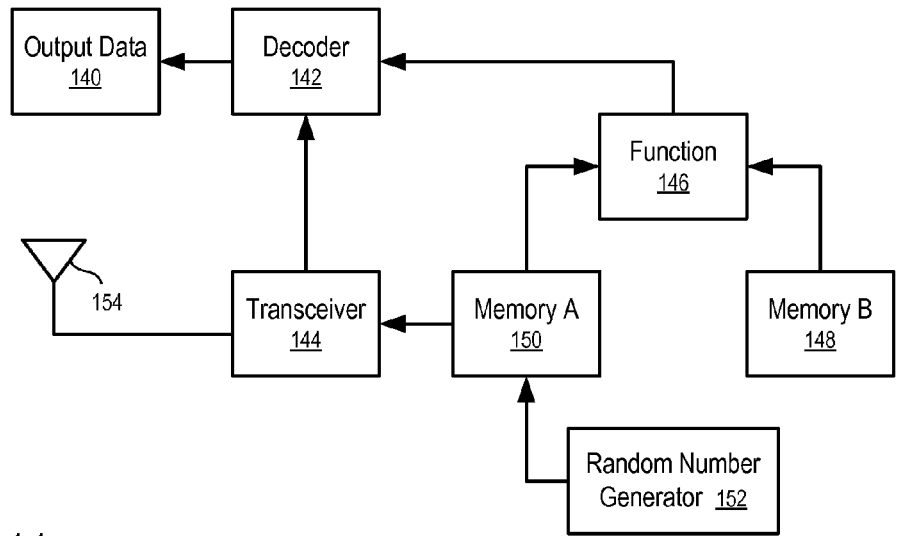
FIG. 11 shows a block diagram of a radio frequency identification (RFID) tag according to one embodiment.

FIG. 11 shows a block diagram of a radio frequency identification (RFID) tag according to one embodiment. In FIG. 11, the tag includes a memory B (148) to store a secret and a memory A (150) to store a random number provided by the random number generator (152). Through the antenna (154) the transceiver (144) is to transmit the random number to the reader and to receive encrypted data from the reader. The logic function (146) combines the random number obtained from the memory (150) and the secret obtained from the memory (148) to generate an encryption key for the decoder (142), which decrypts the encrypted data to generate the output data (140).

In some embodiments, the radio frequency identification (RFID) tag includes an integrated circuit implementing the functions of some of the components illustrated in FIG. 11, such as the transceiver (144), the decoder (142), the logic function (146), the memory A (150), the memory B (148), and/or the random number generator (152).

In some embodiments, the decoder (142) and the logic function (146) share the same hardware circuit. For example, the logic function (146) may combine the random number obtained from the memory A (150) and the secret obtained from the memory B (148) in the same way as the decoder (142) which combines the encrypted data obtained from the transceiver (144) and the encryption key obtained from the logic function (146). Thus, when the tag is in the mode of transmitting the random number, the memory A (150) is configured to receive the random number from the random number generator (152) and the logic function (146) is used to generate the encryption key for storage back into the memory B (148); when the tag is in the mode of receiving the encrypted data, the memory A (150) is used to store the encrypted data received by the transceiver; and the logic function (146) is configured to decrypt the received data. Thus, it is not necessary to provide a separate hardware for the decoder.

In some embodiments, the memory (150) is not used; and the random number and/or the encrypted data are provided directly to the function (146).

In some embodiments, a tag is configured to be capable to transmit and/or receive encrypted data using the random number and the secret, based on a command received from the reader. In some embodiments, the tag can include further components not show in FIG. 10. Thus, the radio frequency identification (RFID) tag is not limited to a particular implementation.

In FIG. 11, the logic function (146) is used as a key generator, which can be implemented using a modular adder to generate the encryption key from the random number stored in the memory A (150) and the secret number stored in the memory B (148).

In some embodiments, the key generator can be used to replace the decoder (142) to further decrypt received encrypted data and/or to generate encrypted data using the encryption key. In one embodiment, the modular adder is implemented using a logic block to perform bitwise exclusive OR operations.

Figure 12:
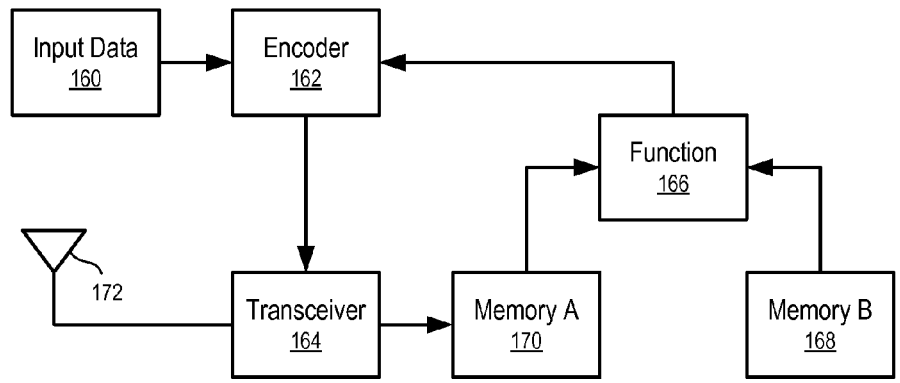
FIG. 12 shows a block diagram of a radio frequency identification (RFID) reader according to one embodiment.

FIG. 12 shows a block diagram of a radio frequency identification (RFID) reader according to one embodiment. In FIG. 12, the reader includes a memory B (168) to store the same secret as the corresponding memory (148) of the transmitting system of FIG. 11. The memory A (170) is to store the random number obtained from the transceiver (164). The logic function (166) combines the random number obtained from the memory A (170) and the secret obtained from the memory B (168) to generate the same encryption key as the tag of FIG. 11. The encoder (162) uses the encryption key to encrypt the input data (160) for transmission by the transceiver (164) through the antenna (172).

In some embodiments, the reader further includes a decoder to decrypt the encrypted message received at the transceiver. In some embodiments, the encoder, decoder and/or the function (166) used to generate the encryption share the same hardware (e.g., a logic block to perform bitwise exclusive OR operations, or a microprocessor). In some embodiments, the reader can include further components not show in FIG. 11. Thus, the reader is not limited to a particular implementation.

In some embodiments, the components of the reader as illustrated in FIG. 12 (or the transmitting systems as illustrated in FIG. 9, the receiving system as illustrated in FIG. 10, or other systems described in the disclosure) are implemented via hardware circuit (e.g., an integrated circuit). Alternatively, at least some of the components of the reader (or transmitting systems or receiving systems) can be implemented using software executing on a general purpose or special purpose microprocessor. Thus, embodiments of the disclosure can be implemented using hardware, programs of instruction, or combinations of hardware and programs of instructions.

Figure 13:
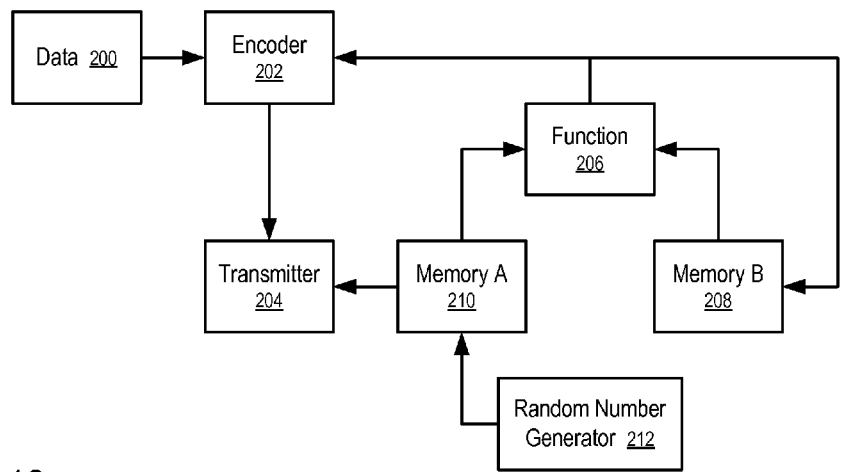
FIGS. 13 and 14 show systems to transmit encrypted messages according to other embodiments.
Figure 14:
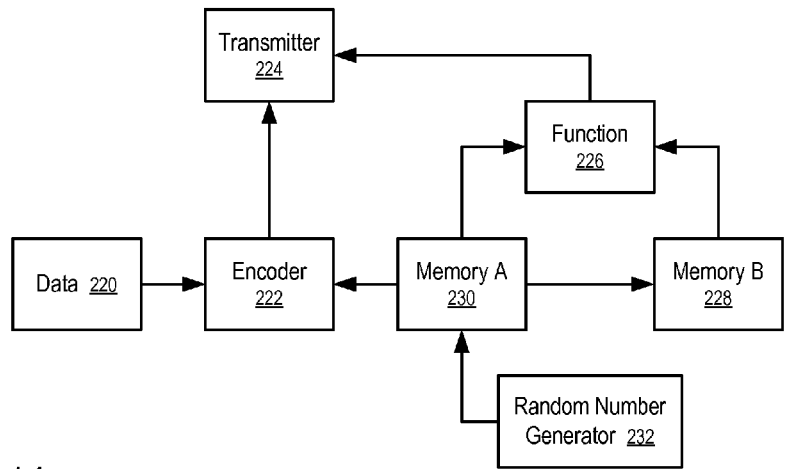

In some embodiments, the secret used to generate the encryption key is updated using the random numbers, as illustrated in FIGS. 13 and 14.

In FIG. 13, the secret stored in the memory B (208) is updated according to the random number transmitted. To transmit data (200) using the transmitter (204), the random number generator (212) provides a random number to the memory (210). The random number and the secret stored in the memory B (208) are used in the function (206) to generate an encryption key. The encryption key is stored back into the memory B (208) as the new secret for the generation of the next encryption key; and the current encryption key is used in the encoder (202) to encrypt the data (200). The transmitter (204) is configured to transmit the encrypted data and the corresponding random number.

In FIG. 13, the secret is updated in response to each transmission of the random number provided by the random number generator. Alternatively, the secret can be updated periodically or in response to a command (e.g., a command from an RFID reader or a controlling device).

In one embodiment, the random number is at least as long as the data (200). In some embodiments, the random number stored in the memory A (210) and the secret stored in the memory (B) have the same length.

In some embodiments, the same secret in the memory (208) is applied on multiple random numbers to generate multiple encryption keys which can be used as a combined encryption key that is as long as the data (200). The data (200) is divided into multiple blocks, each having a length no longer than a random number stored into the memory A (210) and each encrypted using an encryption key generated from the corresponding random number. The secret in the memory (208) can be updated after the entire data (200) is transmitted, or updated after the encryption of each block of the data (200). For example, after each random number is used to generate a segment of the combined encryption key, the new segment of the combined encryption key can be stored back into the memory B (208) as the new secret for the key generation for the next block of the data (200).

In one embodiment, the random number and the encrypted data are transmitted sequentially in separate transmissions (e.g., in response to separate requests). For example, the encrypted data is transmitted after the random number is transmitted. Alternatively, the random number and the encrypted data can be transmitted in one response, or as multiple groups of responses.

In FIG. 14, the random number generated from the random number generator (232) is not transmitted directly. Instead, the random number stored in the memory A (230) is combined with the secret stored in the memory B (228) to generate an encrypted random number using the function (226). The random number stored in the memory A (230) is used in the encoder (222) to encrypt the data (220) for transmission by the transmitter (224). The transmitter (224) is configured to send the random number encrypted using the secret and the message separately encrypted using the random number.

Since the secret stored in the memory B (228) protects the random number from the eavesdropper, the random number stored in the memory A (230) can be used to periodically update the secret stored in the memory B (228).

In another embodiment, the random number stored in the memory (230) is not used to encrypt the data (220) directly. Instead, a separate encryption key is generated using a further secret stored in a memory (not shown in FIG. 14). Thus, one secret is used to protect the transmission of the random number; and a separate secret is used to generate the encryption key based on the random number that is transmitted in an encrypted form.

FIGS. 15 and 16 show methods to transmit blocks of a message via interleaving transmission of blocks of random numbers and blocks of cipher text.

In FIG. 15, the message is divided into a number of blocks (300, 302, ..., 304). The same number of blocks of random numbers (310, 312, ..., 314) are generated and transmitted (e.g., from RFID tags to a reader over the air). The random numbers are used to generate corresponding blocks of keys (320, 322, ..., 324) using a shared secret. For example, the random number block (310) is combined with a secret to generate the key block (320) (e.g., via modular adder or bitwise exclusive OR). The generated blocks of keys (310, 332, ..., 334) are used to encrypt the corresponding message blocks (300, 302, ..., 304). In one embodiment, each of the message blocks, random number block, key block and the cipher text block has the same length. When the end portion of the message is shorter than the block length, the message is padded to have the same length as the random number block.

In FIG. 15, the random number blocks and the cipher text blocks are transmitted in an interleaving fashion. For example, the random number block (310) is used to generate the key block (320) which is used to encrypt the message block (300) to generate the cipher text block (330). The random number block (310) is transmitted with the cipher text block (330) as a group. Other groups of the random number blocks and corresponding cipher text blocks are transmitted sequentially thereafter. Thus, the random number blocks are interleaved between cipher text blocks; and the cipher text blocks are interleaved between the random number blocks.

In FIG. 16, the blocks of random keys (e.g., 360, 362, ..., 364) are transmitted as encrypted blocks of the key (e.g., 380, 382, ..., 384). The keys are encrypted using a prior shared secret and/or the prior block of the random keys. The message blocks are encrypted using the random keys. For example, message block (350) is encrypted using the random key block (360) to generate the cipher text block (380). The encrypted key block (380) is transmitted with the cipher text block (380) as a group. Other groups of encrypted key and cipher text are transmitted sequentially thereafter.

Figure 17:
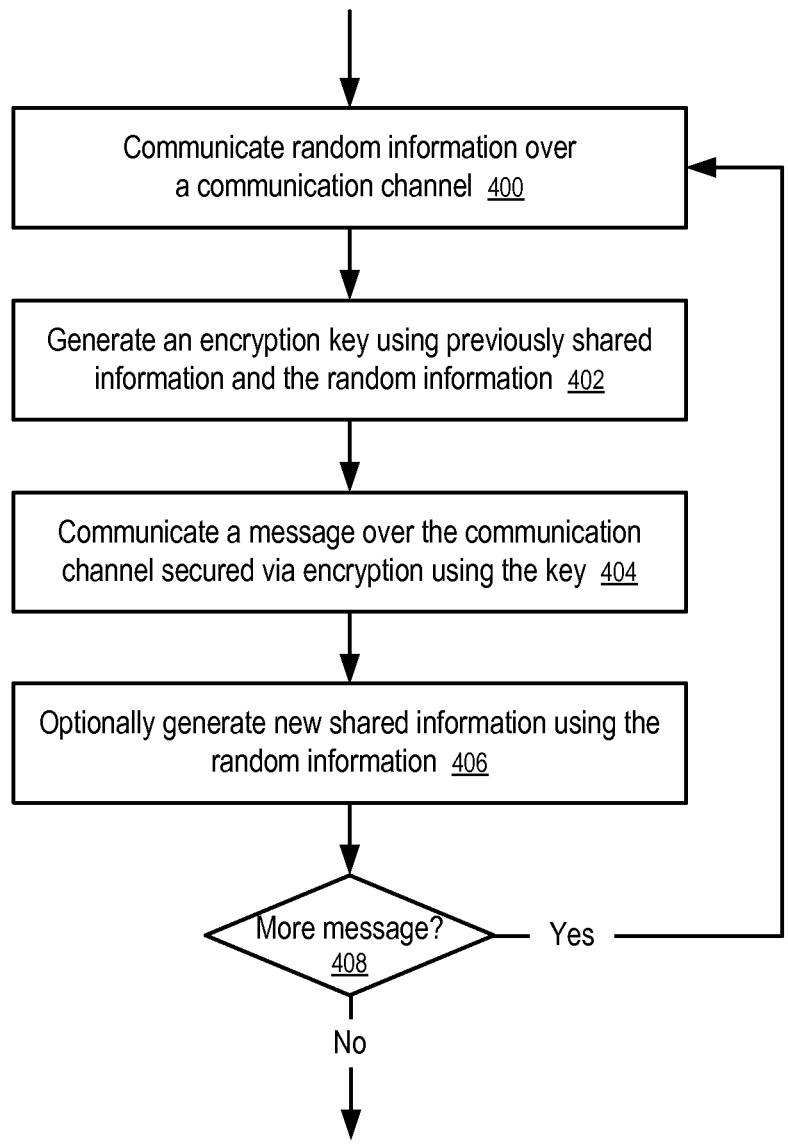
FIG. 17 shows a block diagram of a process to secure data communication according to one embodiment.

FIG. 17 shows a block diagram of a process to secure data communication according to one embodiment. In FIG. 17, random information is communicated (400) over a communication channel, such as a radio link during an RFID reader interrogating one or more RFID tags, or a network connection. An encryption key is generated (402) using previously shared information and the random information. A message is communicated (404) over the communication channel secured via encryption using the key. Optionally, new shared information is generated (406) using the random information to replace the previously shared information for the generation of the next encryption key. For example, the generated the encryption key can be used as the new shared information.

In one embodiment, the operations 400-406 are repeated for each segment of the message that has the same length of random numbers or less until the entire message is transmitted.

In one embodiment, the random information is generated and communicated over the communication channel without using the previously shared information; and the encryption key is generated via encrypting the random information using the previously shared information, or decrypting the previously shared information using the random information.

In one embodiment, the encryption key is first randomly generated and then encrypted using the previously shared information to generate the random information for transmission over the communication channel; and the encryption key is generated via decrypting the random information using the previously shared information.

In one embodiment, the message is divided into a plurality of message blocks. The random information includes a plurality of random blocks corresponding to the plurality of message blocks. The encryption key includes a plurality of key blocks corresponding to the plurality of random blocks. The communicating of the message over the communication channel includes encrypting the message blocks using the key blocks corresponding to the message blocks.

In one embodiment, the random information and the message are transmitted over the communication channel via communicating the random blocks and the encrypted message blocks in an interleaving sequence, where a subset of the random blocks is interleaved between the encrypted message blocks and a subset of the encrypted message blocks between the random blocks. In some embodiments, the random blocks are equal to or longer than the message blocks in length.

In one embodiment, the random blocks have a predetermined length; a first key block is generated from a first random block; and a second key block is generated from the first key block and a second random block.

Figure 18:
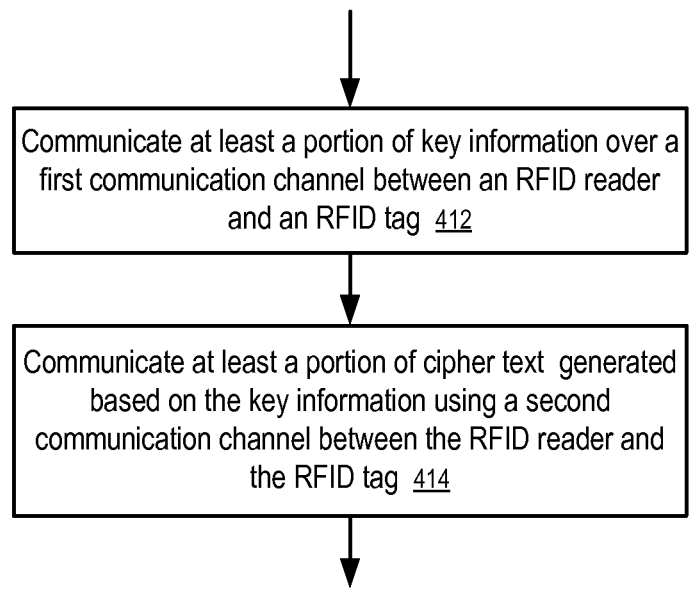
FIG. 18 shows a method to secure data communication using multiple channels according to one embodiment.

FIG. 18 shows a method to secure data communication using multiple channels according to one embodiment. In FIG. 18, at least a portion of key information is communicated (412) over a first communication channel between an RFID reader and an RFID tag (e.g., via radio frequency signals transmitted in a first polarization); and at least a portion of cipher text generated based on the key information is communicated (414) using a second communication channel (e.g., via radio frequency signals transmitted in a second polarization) between the RFID reader and the RFID tag. For example, the key information comprises a random number transmitted from the RFID tag to the RFID reader in response to an interrogation signal from the RFID reader to the RFID tag; and the cipher text is transmitted from the RFID reader to the RFID tag.

In one embodiment, the portion of the key information and the cipher text are transmitted concurrently via the first and second communication channels. In another embodiment, the key information includes a random number transmitted from the RFID tag to the RFID reader in response to an interrogation signal from the RFID reader to the RFID tag; and the cipher text is transmitted from the RFID reader to the RFID tag. In one embodiment, the key information and the cipher text are transmitted in separate and non-overlapping time periods (e.g., different communication sessions separated by at least a third communication session between the RFID reader and a separate RFID tag).

In one embodiment, the key information is transmitted while the RFID tag is at a location which is outside a communication range between the RFID reader and the RFID tag while the portion of the cipher text is generated.

In one embodiment, a further portion of the cipher text generated based on the key information is communicated using a third communication channel between the RFID reader and the RFID tag.

In one embodiment, portions of the cipher text are distributed according to the key information, for transmission over a plurality of communication channels, including the second and third communications channels. The key information may define which of the plurality of communication channels is used to transmit a portion of the cipher text at which time slot. False values can be transmitted using one or more of the communication channels when the one or more communication channels are not selected to transmit the cipher text at a current time slot according to the key information.

In one embodiment, false data and the cipher text are interleaved in different time slops according to the key information for concurrent transmission over a plurality of communication channels.

In one embodiment, a portion of key information is communicated over the second communication channel between an RFID reader and an RFID tag.

In one embodiment, a secret is stored and combined with the key information to generate an encryption key, which is used to generate the cipher text. The secret can be stored at a time of manufacture of the RFID tag. Alternatively, the secret can be exchanged via a separate, secure communication channel.

In one embodiment, the key information comprises a random number generated by the RFID tag in response to an interrogation command from the RFID reader.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A radio frequency identification (RFID) reader comprising:
   a first communication means for wirelessly communicating first radio frequency signals to a RFID tag; and
   a second communication means for wirelessly communicating second radio frequency signals to the RFID tag, wherein the first and second communication means are distinct and separate from each other, wherein at least a portion of key information is communicated to the RFID tag using the first communication means and at least a portion of cipher text generated based on the key information is communicated to the RFID tag using the second communication means.

2. The radio frequency identification (RFID) reader of claim 1, wherein false data and the cipher text are interleaved in different time slots for transmission using the first and second communication means.

3. The radio frequency identification (RFID) reader of claim 2, wherein the first and second communication means are used concurrently in transmitting the false data and the cipher text.

4. The radio frequency identification (RFID) reader of claim 3, wherein in one time slot the first communication means is used to transmit the cipher text and the second communication means is used to transmit the false data.

5. The radio frequency identification (RFID) reader of claim 2, wherein the false data and the cipher text are interleaved in the different time slots according to the key information.

6. A radio frequency identification (RFID) tag comprising:
a first communication means for wirelessly communicating first radio frequency signals to a RFID reader; and
a second communication means for wirelessly communicating second radio frequency signals to the RFID reader,
wherein the first and second communication means are distinct and separate from each other,
wherein at least a portion of key information is communicated to the RFID reader using the first communication means and at least a portion of cipher text generated based on the key information is communicated to the RFID reader using the second communication means.

7. The radio frequency identification (RFID) tag of claim 6, wherein the first communication means comprises a first antenna to communicate the first radio frequency signals in a first polarization, and wherein the second communication means comprises a second antenna to communicate the second radio frequency signals in a second polarization.

8. The radio frequency identification (RFID) tag of claim 6, further comprising a transceiver and memory provided on an integrated circuit chip, wherein the memory is configured to store an identification of the RFID tag.

9. The radio frequency identification (RFID) tag of claim 6, wherein the key information comprises a random number generated in response to an interrogation command from the RFID reader.

10. The radio frequency identification (RFID) tag of claim 6, wherein false data and the cipher text are interleaved in different time slots for transmission using the first and second communication means.

11. The radio frequency identification (RFID) tag of claim 10, wherein the first and second communication means are used concurrently in transmitting the false data and the cipher text.

12. The radio frequency identification (RFID) tag of claim 11, wherein, in one time slot, the first communication means is used to transmit the cipher text and the second communication means is used to transmit the false data.

13. The radio frequency identification (RFID) tag of claim 10, wherein the false data and the cipher text are interleaved in the different time slots according to the key information.

* * * * *